United States Patent
Cherubini et al.

(10) Patent No.: US 8,953,268 B2
(45) Date of Patent: Feb. 10, 2015

(54) METHODS FOR FORMATTING AND USING LINEAR RECORDING MEDIA HAVING A REDUCED SERVO BAND WIDTH

(71) Applicant: International Business Machines Corporation, Armonk, NY (US)

(72) Inventors: Giovanni Cherubini, Rueschlikon (CH); Jens Jelitto, Rueschlikon (CH); Mark A. Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/253,689

(22) Filed: Apr. 15, 2014

(65) Prior Publication Data

US 2014/0226235 A1    Aug. 14, 2014

Related U.S. Application Data

(63) Continuation of application No. 13/080,542, filed on Apr. 5, 2011.

(30) Foreign Application Priority Data

Apr. 30, 2010  (EP) ................................. 10161678

(51) Int. Cl.
  *G11B 20/12*  (2006.01)
  *G11B 5/584*  (2006.01)
(52) U.S. Cl.
  CPC ............ *G11B 20/1201* (2013.01); *G11B 5/584* (2013.01)

USPC ...................... 360/48; 360/78.02; 360/77.12

(58) Field of Classification Search
  None
  See application file for complete search history.

(56) References Cited

U.S. PATENT DOCUMENTS

| 7,139,151 | B2 | 11/2006 | Johnson et al. |
|---|---|---|---|
| 7,199,957 | B2 | 4/2007 | Rothermel et al. |
| 7,199,958 | B2 | 4/2007 | Weber et al. |
| 7,365,929 | B2 | 4/2008 | Cherubini et al. |
| 7,403,350 | B2 | 7/2008 | Bates et al. |
| 7,864,487 | B2 | 1/2011 | Cherubini et al. |
| 8,107,186 | B2 | 1/2012 | Bui et al. |
| 8,159,770 | B2 | 4/2012 | Bui et al. |
| 8,760,795 | B2 | 6/2014 | Cherubini et al. |
| 2009/0040643 | A1 | 2/2009 | Weng et al. |
| 2009/0073603 | A1 | 3/2009 | Koeppe |
| 2011/0267717 | A1 | 11/2011 | Cherubini |

OTHER PUBLICATIONS

Non-Final Office Action from U.S. Appl. No. 13/080,542 dated Aug. 30, 2013.
Notice of Allowance and Fee(s) Due from U.S. Appl. No. 13/080,542 dated Feb. 7, 2014.
Notice of Supplemental Notice of Allowability from U.S. Appl. No. 13/080,542 dated Feb. 21, 2014.

*Primary Examiner* — K. Wong
(74) *Attorney, Agent, or Firm* — Zilka-Kotab, PC (57) ABSTRACT

Methods for formatting and using a linear magnetic recording medium. The medium in one embodiment has a servo band having a width b that is less than or equal to about 1.2 B/N, where N is an integer greater than or equal to 2, and B corresponds to a distance between data read/write transducers of a magnetic head usable with the medium in a direction transverse to a longitudinal length of the medium.

20 Claims, 7 Drawing Sheets

METHODS FOR FORMATTING AND USING LINEAR RECORDING MEDIA HAVING A REDUCED SERVO BAND WIDTH

RELATED APPLICATIONS

This application is a continuation of U.S. patent application Ser. No. 13/080,542 filed Apr. 5, 2011, which claims priority to European Patent Application No. EP 10161678.7 filed on Apr. 30, 2010, and which are all herein incorporated by reference.

BACKGROUND

The present invention relates to linear magnetic recording tapes and corresponding tape drive heads, and more specifically to linear magnetic tape using a timing-based servo technology that has smaller width servo bands and shorter servo frame length.

Various data storage media and recording media such as magnetic tape, magnetic disks, optical tape, optical disks, holographic disks, holographic cards, and the like, allow for storage and retrieval of data. In particular, in magnetic media, data is typically stored as magnetic transitions, e.g., data is magnetically recorded on a surface of the media. The data stored is typically arranged in data tracks. A typical magnetic storage medium, such as a magnetic tape, typically includes several data tracks. Data tracks may be written and read individually, or sets of data tracks may be written and read in parallel. Optical media, holographic media and other media formats may also make use of such data tracks. Transducer (read/write) heads are positioned relative to the data tracks to read/write data along the tracks. Accordingly, a tape drive head locates each data track and accurately follows its path. To achieve this, servo techniques have been developed which allow for a precise positioning of the head relative to the data tracks. One such technique makes use of servo patterns, that is, patterns of signals or recorded marks on the medium, which are tracked by the head. The servo patterns are recorded on the recording medium such as to provide a position reference for the data tracks. In other words, a servo head reads a servo pattern, which is then interpreted by a servo controller into a position error signal (PES). The latter is then used to adjust the distance of the servo head relative to the servo pattern and thereby ensure a proper positioning of the transducers with respect to the set of data tracks.

In a magnetic tape medium, the servo patterns are stored on dedicated tracks (called servo bands). A plurality of patterns may be defined within a servo band and a plurality of servo bands might be relied upon, the data tracks being arranged between the servo bands. A particular servo technique is the time-based servo (TBS) pattern, which makes use of non-parallel marks, to which time or distance variables may be associated. The time/distance offset between the detection of a set of servo marks is translated into a position signal. A PES may then be generated by subtracting a reference signal from the position signal to determine the position of transducer relative to a data track.

BRIEF SUMMARY

In one embodiment, a method for using a linear magnetic recording medium is provided. The medium has a servo band having a width b that is less than or equal to about 1.2 B/N, where N is an integer greater than or equal to 2, and B corresponds to a distance between data read/write transducers of a magnetic head usable with the medium in a direction transverse to a longitudinal length of the medium. The method includes positioning a magnetic head in a first lateral medium region of the medium of width b with a first servo reader of at least one group of N servo readers of the magnetic head for reading the servo band, and positioning the magnetic head in a second lateral region of width b with a second servo reader of the at least one group of N servo readers for reading the servo band.

In one embodiment, a method for formatting a linear magnetic recording medium includes writing at least one servo band to a magnetic medium, the at least one servo band having a servo pattern readable by a servo reader of a compatible magnetic head for positioning thereof. The servo pattern substantially fills a width b of the servo band. The servo band width b is less than or equal to about 1.2 B/N, where N is an integer greater than or equal to 2, and B corresponds to a distance between data transducers of the compatible magnetic head in a direction transverse to a longitudinal length of the medium.

In yet another embodiment, a method is implemented in a system having a magnetic head with one or more groups of at least two servo readers, the magnetic head also having one or more groups of data read/write transducers spaced apart the distance B in the main direction of the head. The method includes positioning a first servo reader of a group of servo readers of a magnetic head in a first lateral medium region of a servo band having width b that is less than or equal to about 1.2 B/N, here N is an integer greater than or equal to 2, and B corresponds to a distance between data read/write transducers of the magnetic head in a direction transverse to a direction of travel of the medium relative to the head. A first read and/or write operation is conducted on a portion of a data band. A position of the magnetic head is adjusted during the first read and/or write operation based on signals from the first servo reader reading the servo band. A second servo reader of the group of servo readers of the magnetic head is positioned in a second lateral medium region of the servo band. A second read and/or write operation is conducted on another portion of the data band. A position of the magnetic head is adjusted during the second read and/or write operation based on signals from the second servo reader reading the servo band.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

According to one general embodiment, a linear magnetic recording tape includes at least one servo band having a servo pattern readable by a servo reader of a magnetic head for positioning thereof wherein the servo pattern is adapted to substantially fill a width b of the servo band, the servo band width b is less than or equal to about 1.2 B/N, with N being an integer greater than or equal to 2, and B corresponds to a distance between data read/write transducers of the magnetic head in a direction transverse to a longitudinal length of the tape.

According to another general embodiment, a method for using a linear magnetic recording tape includes providing a linear magnetic recording tape, having at least one servo band having a servo pattern readable by a servo reader of a magnetic head for positioning of the magnetic head, wherein the servo pattern is adapted to substantially fill a width b of the servo band, the servo band width b is substantially equal to B/N, with N being an integer greater than or equal to 2, and B corresponds to a distance between data read/write transducers of the magnetic head in a direction transverse to a longitudinal length of the tape.

Figure 1:
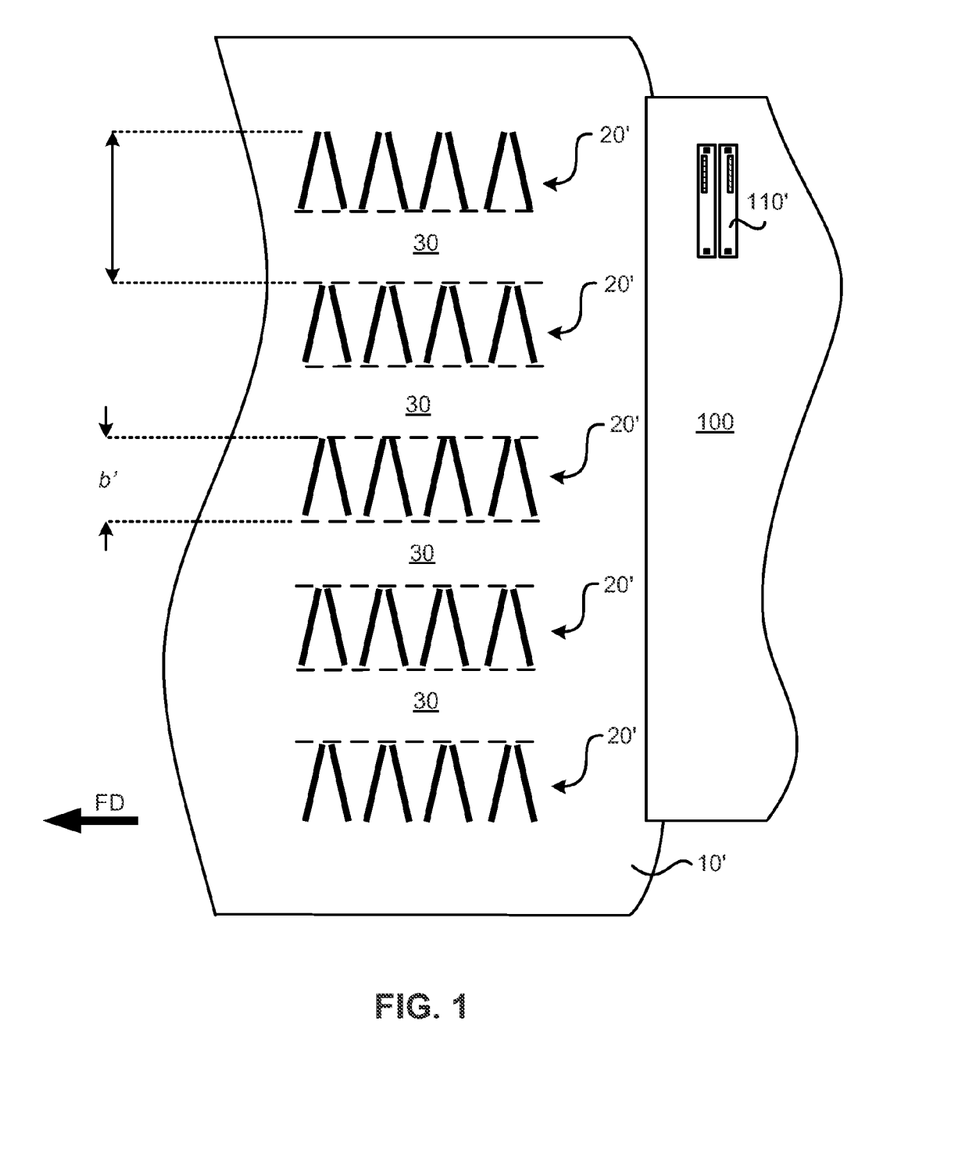
FIG. 1 schematically illustrates a prior art TBS linear tape medium.
Figure 2:
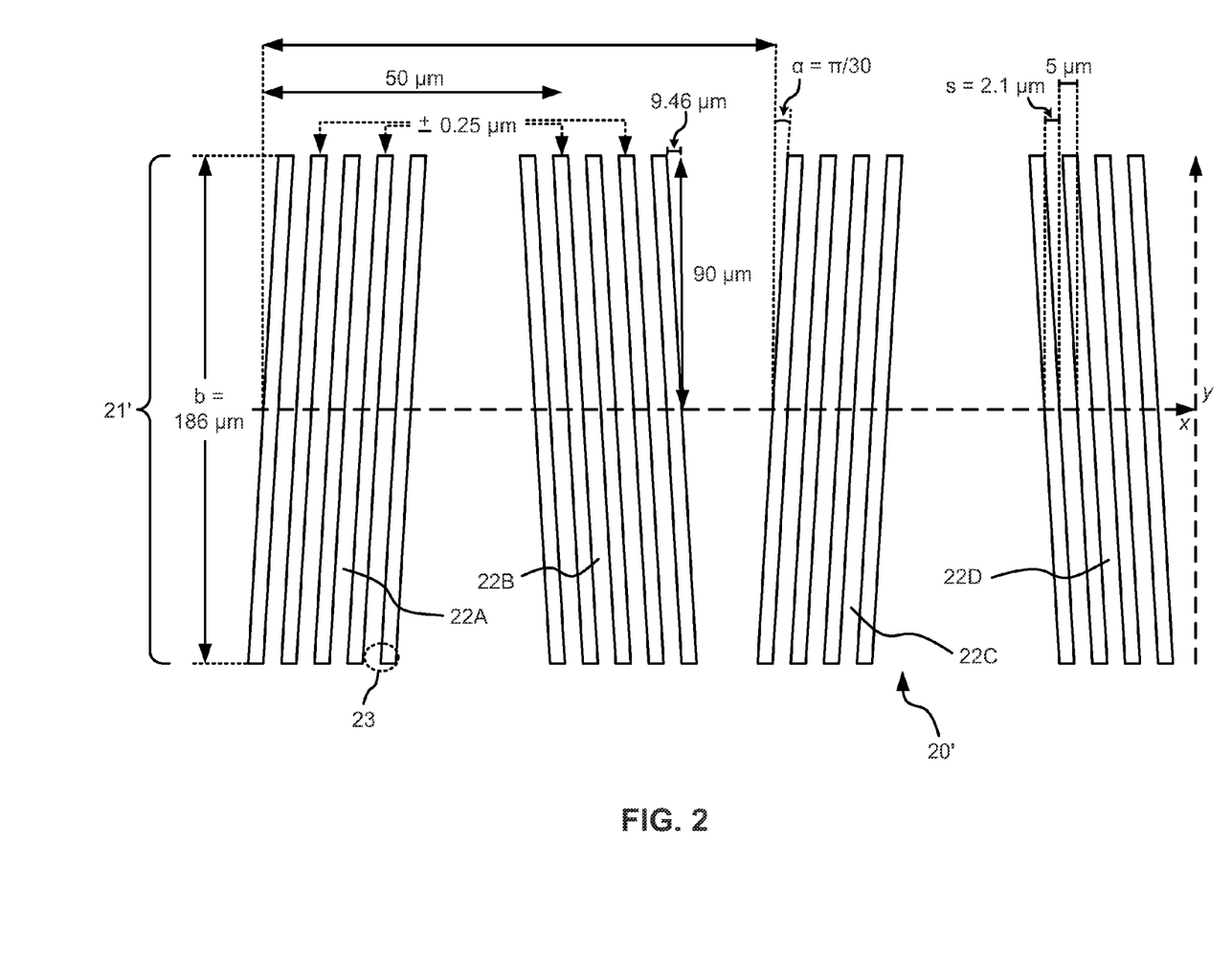
FIG. 2 schematically depicts a prior art pattern of a typical servo band.
Figure 3:
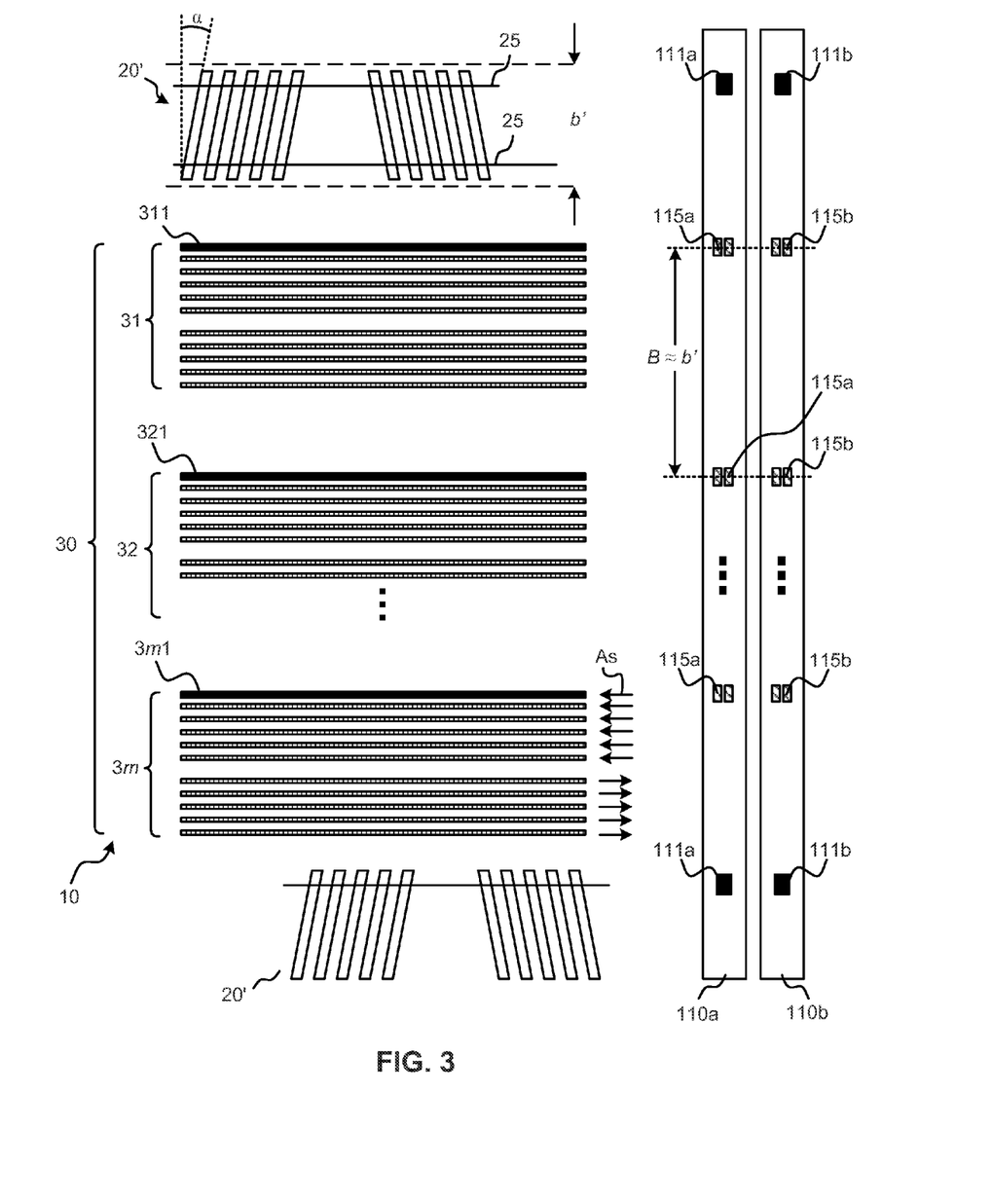
FIG. 3 depicts a prior art TBS system, wherein a tape drive head is operated along a linear tape medium.

To describe servo patterns in somewhat more detail, reference is made to FIGS. 1-3. The time-based servo (TBS) pattern technology was developed specifically for linear tape drives in the late 1990's. In a TBS system, a linear recording tape has one or more servo patterns which consist of transitions with two different azimuthal slopes, measured from perpendicular to a longitudinal length of the linear recording tape. A typical linear recording tape 10' is illustrated in FIG. 1. It notably shows a typical servo pattern 20', also depicted in more details in FIG. 2. While reading from or writing to the tape, the tape moves relative to the head in the longitudinal direction x along the longitudinal length of the tape. In addition, the tape drive head 110' is moved in the direction y, e.g., transverse to the direction x. In FIG. 1, the arrow FD denotes a forward direction of the tape motion. As explained above, the position of the head is derived from the relative timing of pulses generated by a servo reader reading the pattern, which obviously depends on the y-position of a servo-reader of the head. FIG. 2 illustrates the geometry of a servo pattern as specified in the so-called linear tape-open (LTO) format.

For instance, assuming a constant velocity of a tape comprising the following servo pattern "///// \\\\\", the relative timing of pulses generated by successive marks "/////" and "\\\\\" increases as the head moves downwards and it decreases as the head moves upwards. Thus, for a given pattern, a known period corresponding to a given servo location line defined in the pattern and a constant tape velocity, the distance between the servo location and a data track can be monitored. Incidentally, TBS patterns are implemented in magnetic tape media but may also be useful in other media, as disclosed previously.

The complete format for LTO drives of generation 1 (LTO-1) was standardized by the European Computer Manufacturers Association (ECMA) in 2001 as ECMA-319. Additional information on LTO technology, in particular on LTO drives of generations 2 to 4 (LTO-2 to LTO-4), where the servo format was not modified, can be found on the World Wide Web (www), e.g. http://www.ultrium.com. TBS patterns also allow the encoding of additional longitudinal position (LPOS) information without affecting the generation of the transversal position error signal (PES). This is obtained by shifting transitions from their nominal pattern position x as also shown in FIG. 2.

Furthermore, referring to FIGS. 1 and 3, a servo pattern 20' is prerecorded in several servo bands distributed across the tape, e.g. five bands in both the LTO servo format and IBM's proprietary servo format. The servo pattern 20' occupies a width b'. Storage data is recorded in the regions 30 (data bands) located between pairs of servo bands. A data band 30 is partitioned into in sub-bands, 31-3m, that correspond to the data read/write transducers hosted in the head, i.e., m is equal to the number of transducers simultaneously reading or writing m data tracks, which form a wrap. Each sub-band is partitioned into n tracks that belong to the n wraps. For example, in FIG. 2, the bold tracks 311, 321, . . . , 3m1 correspond to what is usually referred to as wrap 0 for data band 0 in the LTO specification. FIG. 1 schematically illustrates the positioning of the five servo bands and the four data bands 30 as specified in the LTO format. In the read/write heads of LTO and IBM Enterprise tape drives, at least two servo readers are normally available per head module, from which LPOS information as well as position information can be derived. In addition, the head of the tape drive typically consists of at least two head modules. For example, in FIG. 3, the left head module 110a of head 110 hosts at least two servo readers 111a.

Several methods exist for he detection of the servo patterns. Such methods ensure the processing of a servo signal for the generation of not only the lateral position y-estimates hut also for the generation of velocity estimates of a tape relative to a tape drive head in the longitudinal x direction, which are then employed for controlling track-following and reel-to-reel servomechanisms of the tape drive. It turns out that the quality of the PES estimates, which are obtained from the y-estimates, depends on various parameters of the servo patterns. One such parameter is the azimuth angle $\alpha$ ($\alpha$=6° for LTO standards 1 to 5) measured from perpendicular to the longitudinal x direction. Other parameters are the servo reader width and servo stripe width s, that is, the minimum distance between magnetic transitions (e.g., s=2.1 μm for LTO 1 to 5). The width of the servo band is usually the same from one standard to another. These parameters impact the resolution of the position error signal used for track following. Ultimately, the resolution of this signal limits track following performance and hence the track density that can be achieved. At high storage areal densities, an optimization of the servo pattern geometry is used in order to achieve a minimum value of standard deviation of the PES.

In the prior art, servo pattern optimization was merely focused on the choice of: (i) the azimuth angle a which increases the position signal resolution, and (ii) the pattern itself, for minimizing written-in velocity errors. For example, it is known that increasing the azimuth angle $\alpha$ from 6° to 12° or even 18°, a substantial improvement in the quality of position signal estimation can be achieved, which translates into lower values of PES standard deviation. Similarly, it is known that the so-called "M" and servo patterns lead to PES estimation, which is insensitive to written-in velocity errors.

Next, in linear tape drives, the in read/write transducers are evenly spaced at, e.g., a pitch of 166.5 μm across the width of a data band of 2664 μm in LTO 4. The data band area is written/read by writing/reading in tracks simultaneously forming a wrap and laying out the wraps in a serpentine fashion. This is reflected in FIG. 3, as the successive arrows "As" indicate tracks that belong to different wraps. A data band 30 is, for instance, filled by running the tape firth and back n times forming 2n wraps, shifting the position of the read/write transducers to another wrap location at each pass and this operation is repeated, until the entire data band is filled. The position in the servo band. 20' that corresponds to a given wrap (e.g., the tracks 311, 321, 3m1 of wrap 0) is referred to as a servo location. Two such servo locations are depicted by horizontal lines 25 in FIG. 3. As explained above, the servo pattern provides position information for positioning the head at each of these wrap locations. Hence, the width of the servo band (186 μm in the example of FIG. 1, but not so limited) is primarily determined by the pitch between adjacent transducers in the read/write head, in the direction transverse to the tape length. This pitch is turn determined by the number m of parallel channels implemented. For example, LTO 4 drives comprise 16 parallel data channels, resulting in a pitch between writers of about 2859 μm/16~166.5 μm. This substantially corresponds to the typical servo band width, 186 μm, subject to a margin that accounts for the width of the servo reader and for tracking errors. Accordingly, the servo band width is chosen such as to provide tracking information for all wrap locations in a data band.

In addition to the resolution of the y-position estimates described above, it can be realized that another parameter is used for determining the performance of the track following control system, which is the update rate of the position estimates. A high update rate is particularly useful for operation at low tape velocities, which is used for matching the drive data rate to the data rate of slower hosts. Thus, ideally, an increase to both the resolution of the pattern as well as the update rate of the lateral position and velocity estimates may be used in combination. Unfortunately, increasing the azimuth angle of the servo stripes in order to increase the resolution of the servo pattern reduces the update rate, typically.

As an introduction to the following description, general aspects of the invention are described first, notably directed to a linear recording tape. The tape comprises at least one servo band, the latter showing a pattern which can be read by servo readers of a tape drive head for positioning purpose, as explained previously. The pattern may, for instance, exhibit stripes oriented at a given azimuth angle $\alpha$ and arranged in successive servo bursts, with each burst typically including a given number of stripes. The servo pattern is configured such as to substantially fill a width b of the servo band.

According to one embodiment, a solution to the problems outlined earlier (increasing $\alpha$ results in a reduction of the update rate of the lateral position and velocity estimates) is to reduce the width b of the servo band approximately by a factor of N, with N being an integer greater than or equal to 2, and to concurrently increase the number of servo readers per head module by the same factor N. Thus, b is chosen such as to broadly correspond to B/N, such as being less than or equal to about 1.2 B/N, or substantially equal to B/N, e.g., within 1% of B/N within 5% of B/N, within 10% of B/N, within 20% B/N, etc., where B substantially corresponds to a minimal distance between read/write transducers of the head, in a main direction thereof, e.g., perpendicular to the longitudinal tape length. The additional servo readers are placed aligned with the "original" servo readers in the main direction of a head module, and two adjacent servo readers are spaced apart a distance approximately equal to the width b of the servo band, according to this embodiment.

Figure 4:
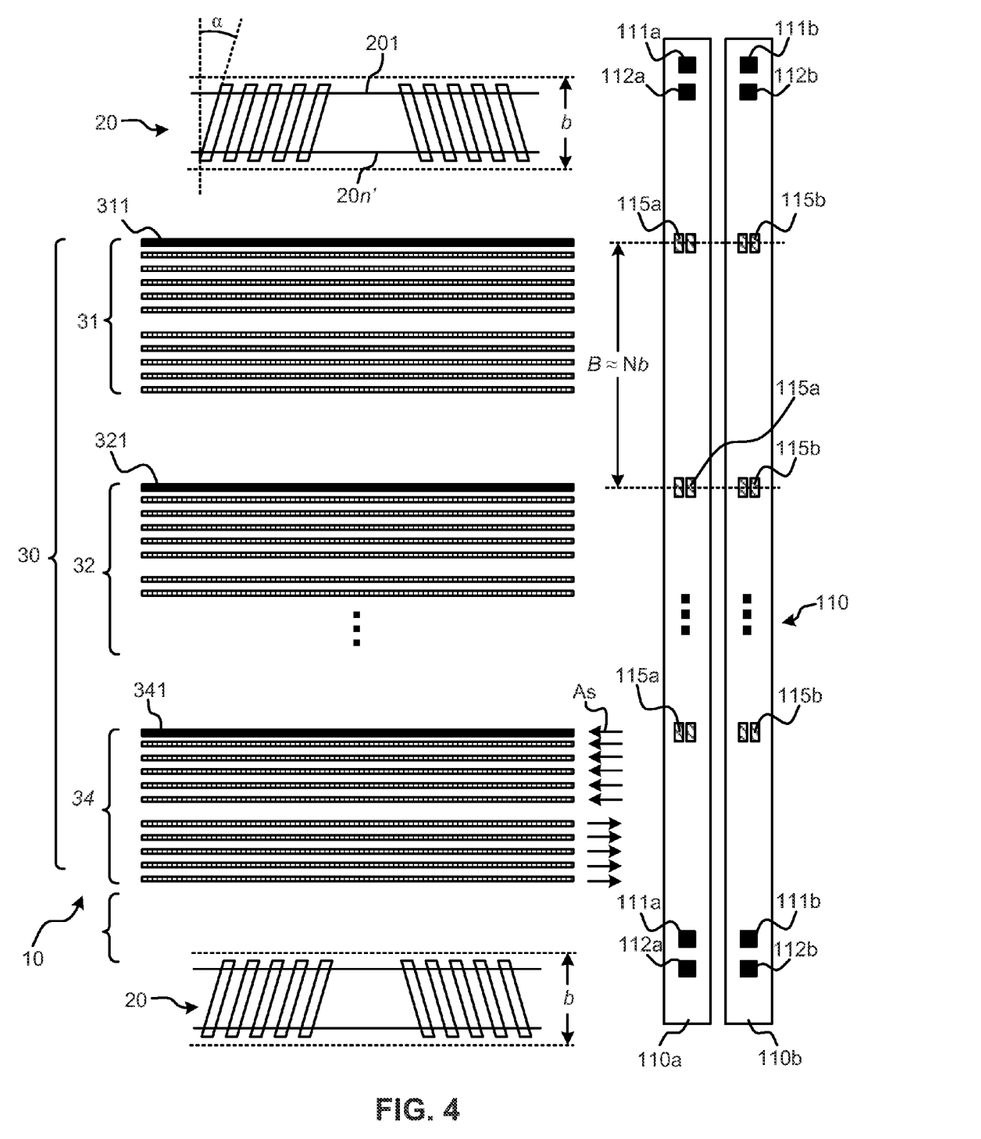
FIG. 4 illustrates a TBS system, according to one embodiment, wherein the tape drive head and the recording tape medium depicted correspond to two complementary embodiments.
Figure 5:
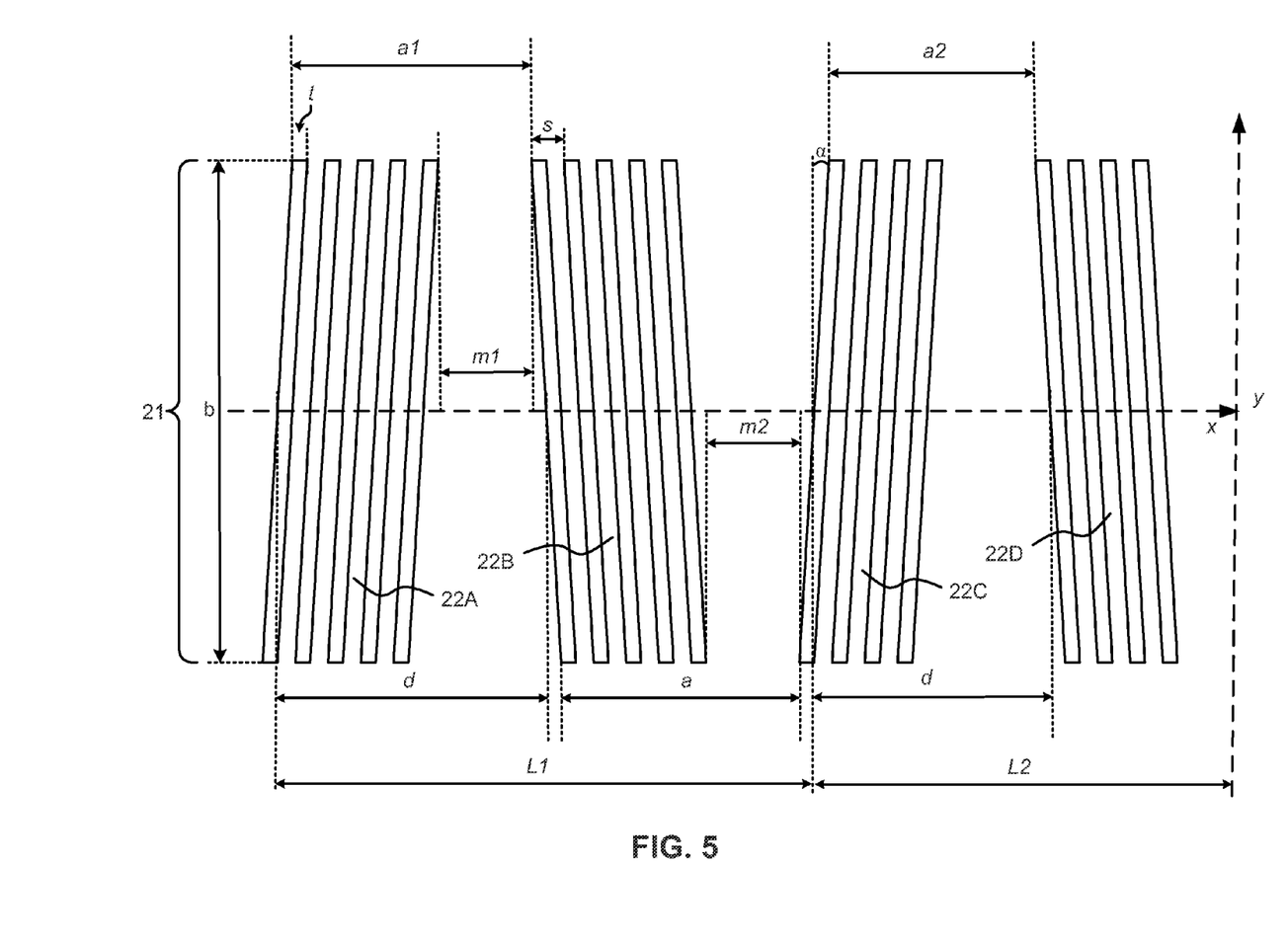
FIG. 5 represents a servo pattern of a servo band of a tape, according to one embodiment.

Within a head module, N vertically aligned servo readers form a group of servo readers. Typically, two groups of N servo readers are hosted by one head module. FIG. 4 shows an illustration of this concept for the case where N=2, with the servo readers 111a, 112a forming two groups that belong to the head module 110a, and 111b, 112b forming two groups that belong to the head module 110b. Particulars of this embodiment can be easily understood by comparing it to a known TBS system, such as that of FIG. 3. Both FIGS. 3 and 4 depict a linear recording tape 10 (e.g., a magnetic tape), one or more servo bands 20 (FIG. 4) or 20' (FIG. 3), wherein a suitable servo pattern is defined. The latter may for instance correspond to the pattern 21' of FIG. 2, let alone the dimensions. As shown in FIG. 5, a servo pattern may comprise stripes oriented at an azimuth angle $\alpha$ and arranged in bursts 22A-22D. As shown and described later in reference to FIG. 5, other advantageous patterns may be relied upon, according to various embodiments.

Referring again to FIGS. 3-4, at each time, the servo pattern is read by one out of N servo readers per group of servo readers, for example servo readers 111a or 112a of a tape drive head module 110a. Each active servo reader is positioned at one of servo locations 201, 20n' defined in the servo band. Note that the n' servo locations define n wrap locations, where n=Nn'. The servo pattern substantially fills the total width b of the servo band. The head is part of a tape drive, e.g., as denoted by reference 100 in FIG. 1. Of course, any tape drive may be used, as would be apparent to one of skill in the art upon reading the present descriptions.

According to one embodiment, in the system depicted in FIG. 4, the width b may advantageously be reduced to about B/N, as opposed to the system depicted in FIG. 3, where B substantially corresponds to the distance between data read/write transducers 115 (i.e., along the main direction of the head). In other words, b≈B/N, with N≥2, as shown schematically in FIG. 4, while a typical prior art system uses b≈B, as shown schematically in FIG. 3.

In the embodiment of FIG. 4, according to one embodiment, servo readers 112a or 112b are used for track following at servo locations 25 defined within the servo band (e.g., 0 to 5), while reading/writing data tracks at a given wrap location. Later, the head may be shifted such that the same servo readers 112a or 112b are used for reading/writing at another wrap location, in one approach. Alternatively, the head may be shifted such that other servo readers 111a or 111b are used for track following, while reading/writing at yet another wrap location (e.g., 6 to 11). Note that in this case n'=6 servo locations lead to n=12 wrap locations. In one approach, each servo reader within a group may be assigned an individual set f servo locations. In all cases, this scheme effectively amounts to using distinct wrap cations, e.g., 0 to 11, spanning an effective width 2b, i.e., twice the distance that is actually supported by the servo band. This is possible owing to the pitch of the servo readers 111, 112, in the y-direction.

Note that if wraps are written in a serpentine fashion, as customarily done in LTO 1 to 5, for N even the top N/2 servo readers in a group may be used for reading/writing in one direction, whereas the bottom N/2 servo readers in the same group may be used for reading/writing in the other direction, in one embodiment. Accordingly, resorting to N≥2 readers in a group leads to a reduced servo band area.

In the embodiment of FIG. 4, the width of the servo pattern may be reduced to ~186/2 μm, allowing either a higher update rate, and/or an increased azimuth angle at constant update rate compared to the 186 μm width case. As less media area is used for the servo pattern, the area saved is furthermore potentially available for writing additional data. For the case of N=2, this results in roughly a 3.5% increase in capacity, in one approach. Conversely, shorter tapes may be designed, while maintaining a constant capacity, in another approach.

Greater detail about the width b of the servo band is now discussed. Broadly, the servo band width may be reduced to b≈B/N, in one embodiment, as discussed so far. Typically, in LTO 1 to 5, B may range from about 186 μm to about 192 μm. Yet, the actual width b may be slightly larger, i.e., augmented with a margin that accounts for the physical width of the servo readers and the manufacturing tolerances. In addition, the margin may be slightly extended to account for tracking errors that may occur during track following operation.

For example, and as discussed earlier, a typical drive with 16 parallel data channels results in a pitch between head read/write transducers of B≈166.5 μm. Thus, B/N may be said to "substantially" correspond to a reduced servo band width b=186/N μm, subject to an 11.6% margin in this case. More generally, it has been realized that an optimal servo band width matches B/N to a margin of about 20% in most practical cases, e.g., b may be less than about 1.2 B/N. Yet, how exactly b departs from the ideal B/N depends on actual implementation details.

The same principle may be extended to larger N values, e,g., N=3, 4, . . . 8, etc., resulting in still higher update rate or increased azimuth angle, according to various embodiments.

Next, as illustrated in FIG. 4, two parallel groups of servo readers (111a, 112a, and 111b, 112b) may be used in two head modules 110a and 110b, respectively, in one embodiment. The same may be seen in FIG. 3, where a servo reader 111a is supplemented with another one 111b. Similarly, as shown in FIG. 4, parallel groups of transducers 115a, 115b may be used, as known in the art to support read-while-write operations in both directions. More generally, a tape drive head according to embodiments discussed herein may exhibit one, two, four, e.g., more than two head modules. In such configurations, a tape drive head may comprise at least two, four, or six groups of N≥2 servo readers, respectively.

Incidentally, additional refinements may be used to reduce the width of the servo band. A first method is, for instance, to increase the number of read/write elements that operate in parallel, which reduces the number of servo locations used to fill a data band. For instance, increasing the number of read/write elements by a factor of two allows the width of the servo band to be decreased by the same factor. Such a change, however, impacts other aspects of the system and may also lead to cross-talk problems, due to the decreased distance between adjacent elements. Another approach is to increase the number of data bands, which also decreases the number of required servo locations to fill a data band and hence allows the width of the servo band to be decreased. For example, increasing the number of data bands from 4 to 8 allows the width of the servo band to be reduced by a factor of about 2. However, such an approach may also lead to cross talk problems (again due to a reduced pitch between elements) and further introduces backward compatibility problems, in the prior art. Yet, embodiments described herein may be used in combination with either or both of these additional approaches to achieve an additional decrease in the width of the servo band.

The servo pattern shown in FIG. 5 broadly includes stripes arranged in servo bursts, oriented with an azimuth angle α, whose absolute value is about 18°, according to one embodiment. As FIG. 5 shows, this angle is measured from the vertical axis and its actual sign alternates at each burst. The width b of the servo band is substantially equal to about 23.25 μm in that case, but may be any value as determined by the other design dimensions. It may be realized that such a pattern achieves a 3× increase in azimuth angle and a 2× increase in update rate compared to a usual pattern such as the LTO 5 pattern, discussed earlier. Interestingly, it could be used in conjunction with N=8 servo readers, 16 parallel data channels and 4 data bands, or N=4 servo readers, 32 parallel data channels and 4 data bands, or still N=2 servo readers, 32 parallel data channels and 8 data bands, according to various embodiments. Thus, the same pattern allows for various possible tape configurations in various embodiments.

In more detail, the pattern actually depicted in FIG. 5 is defined by the parameters reported in Table 1, below, wherein the angle value is in degrees and other values are in micrometers.

TABLE 1

| Parameters defining the servo pattern of FIG. 5, according to one embodiment | | | | | | | | |
|---|---|---|---|---|---|---|---|---|
| α | B | d | t | s | a1 | m1 | a2 | m2 |
| 18 | 23.25 | 25.00 | 1.25 | 3.00 | 17.45 | 4.20 | 17.45 | 4.19 |

Note that in FIG. 5, the stripes are arranged in servo bursts numbering four, with the first two bursts having 5 stripes and the following two bursts having 4 stripes, as used for stripe patterns already. The bursts form a servo frame of a given longitudinal length L=L1+L2 (e.g. L≤100 μm and L1=L2). In a variant, each of the bursts may comprise the same number of stripes (e.g., 4, 5, or sonic other number). An equal number of stripes leads to either a higher update rate or an increased averaging capability for a given servo frame length, according to some embodiments. Note that increased averaging results in an increase in lateral position resolution.

Referring again to FIGS. 4-5, according to one embodiment, a linear magnetic recording tape 10 comprises at least one servo band 20 having a servo pattern 21, readable by a servo reader of a magnetic head for positioning of the magnetic head. The servo pattern is adapted to substantially fill a width b of the servo band, the servo band width b is less than about 1.2 B/N, substantially equal to B/N, etc., N is an integer greater than or equal to 2, and B corresponds to a distance between data read/write transducers of the magnetic head in a direction transverse to a longitudinal length of the tape.

According to one embodiment, the servo band width b may further comprise a first margin to account for a width of the servo reader. In a further embodiment, the servo band width b may comprise a second margin to account for track following servo operation.

According to another embodiment, N may equal 4 or 8, or some greater integer.

In one embodiment, a magnetic data storage system may comprise a magnetic head comprising at least one group of N≥2 servo readers adapted for reading the servo pattern, wherein each servo reader is positioned apart from one another by a distance substantially equal to the servo band width b in a main direction of the magnetic head, which in operation is transverse to the longitudinal tape length, and one or more groups of data read/write transducers spaced apart the distance B in the main direction of the head. The magnetic data storage system may also comprise a linear magnetic recording tape as described according to any embodiment herein, a drive mechanism for passing the linear magnetic recording tape over the magnetic head, and a controller electrically coupled to the magnetic head for controlling operation of the magnetic head.

According to more embodiments, the magnetic head may comprise at least one group of N=4 servo readers or N=8 servo readers, the magnetic head may comprise at least four groups of N≥2 servo readers or at least six groups of N≥2 servo readers, or more, etc.

In another embodiment, the servo pattern may comprise stripes oriented at an azimuth angle α, the azimuth angle α of the stripes may be greater than about 6° in absolute value, the stripes may be arranged in servo bursts, and the servo bursts may be readable by the servo reader at given servo locations in the servo band. In further embodiments, the azimuth angle α of the stripes may be equal to or greater than about 12° in absolute value, equal to or greater than about 18° in absolute value, or substantially equal to about 18° in absolute value and the servo band width b may be substantially equal to about 23.25 µm.

In another embodiment, the stripes may be arranged in four servo bursts, each of the four servo bursts comprising a same number of stripes.

Figure 6:
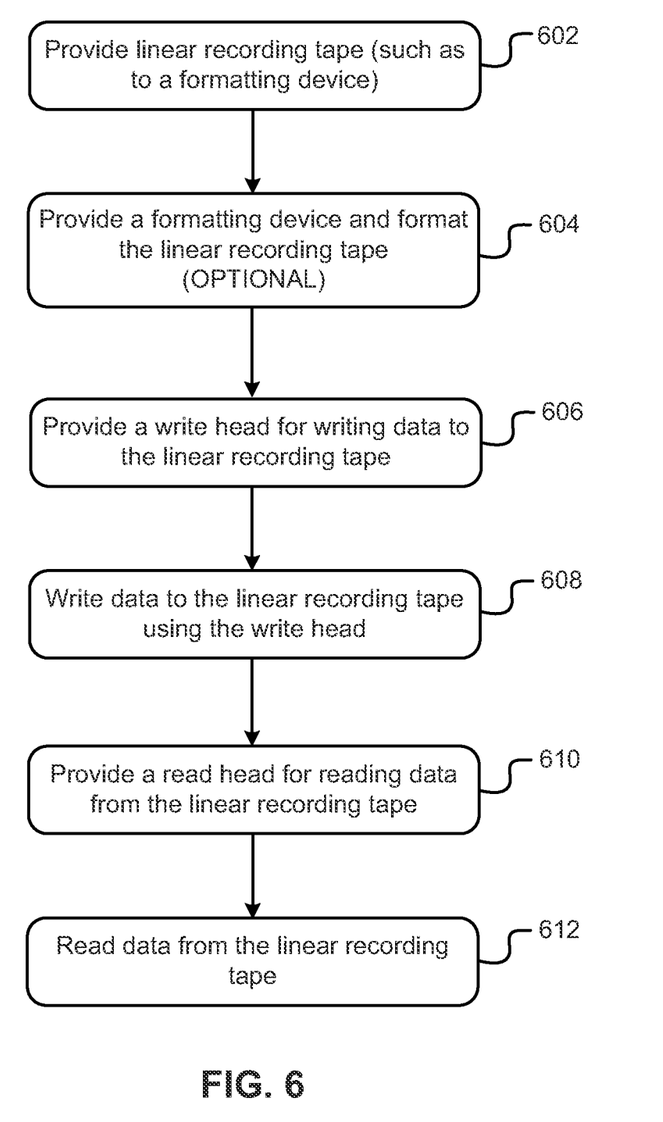
FIG. 6 depicts a method for operating a TBS tape, according to one embodiment.

According to more embodiments, a method 600 of operating linear magnetic recording tape, such as tape described herein, is briefly described in reference to FIG. 6.

In operation 602, in one approach, a linear recording tape is provided. In one embodiment, linear magnetic recording tape comprises at least one servo band having a servo pattern readable by a servo reader of a magnetic head for positioning of the magnetic head, wherein the servo pattern is adapted to substantially fill a width b of the servo band, the servo band width b is substantially equal to B/N, N is an integer greater than or equal to 2, and B corresponds to a distance between data read/write transducers of the magnetic head in a direction transverse to a longitudinal length of the tape.

In optional operation 604, in a case where the linear recording tape is not provided with a servo band width b substantially equal to B/N, as previously described, a formatting device is provided, as known to one of skill in the art, in order to format the desired servo bands having a desired width on the tape. Only minor modifications in the known formatting devices are used, in one approach, in order to achieve a servo band width b substantially equal to B/N.

In optional operation 606, in a case where data is to be written to the tape, a write head is provided.

In optional operation 608, in a case where data is to be written to the tape, the data is written to the tape using the write head.

In optional operation 610, in a case where data is to be read from the tape, a read head is provided.

In optional operation 612, in a case where data is to be read from the tape, the data is read from the tape using the read head.

In either of operations 606 and/or 610, the method 600 may further comprise providing a magnetic data storage system. The magnetic data storage system may comprise a magnetic head (for reading from and/or writing to the magnetic tape) comprising at least one group of N≥2 servo readers adapted for reading the servo pattern, wherein each servo reader is positioned apart from one another by a distance substantially equal to the servo band width b in a main direction of the magnetic head, which in operation is transverse to the longitudinal tape length, and one or more groups of data read/write transducers spaced apart the distance B in the main direction of the head. The magnetic data storage system further comprises a drive mechanism for passing the linear magnetic recording tape over the magnetic head, and a controller electrically coupled to the magnetic head for controlling operation of the magnetic head.

In either of operations 608 and/or 612, prior to reading from and/or writing to the magnetic tape, the method 600 may further comprise positioning the magnetic head within a first lateral tape region of width b with a first servo reader of the at least one group of N≥2 servo readers for reading a first servo band, and positioning the magnetic head within a second lateral tape region of width b with a second servo reader of the at least one group of N≥2 servo readers for reading a second servo band.

Of course, in various embodiments, the write/read head may be provided in a read/write head having both read and write elements capable of reading from and writing to the magnetic tape. The magnetic head may be part of a tape drive with a tape drive head configured and actuated as described earlier in reference to FIG. 4. In particular, the tape may be operated with at least one servo reader reading the servo pattern.

Furthermore, in embodiments described herein directed to a tape drive head module such as described above, a tape drive comprising that module or a system comprising that tape drive and a tape as described earlier may be used.

Figure 7:
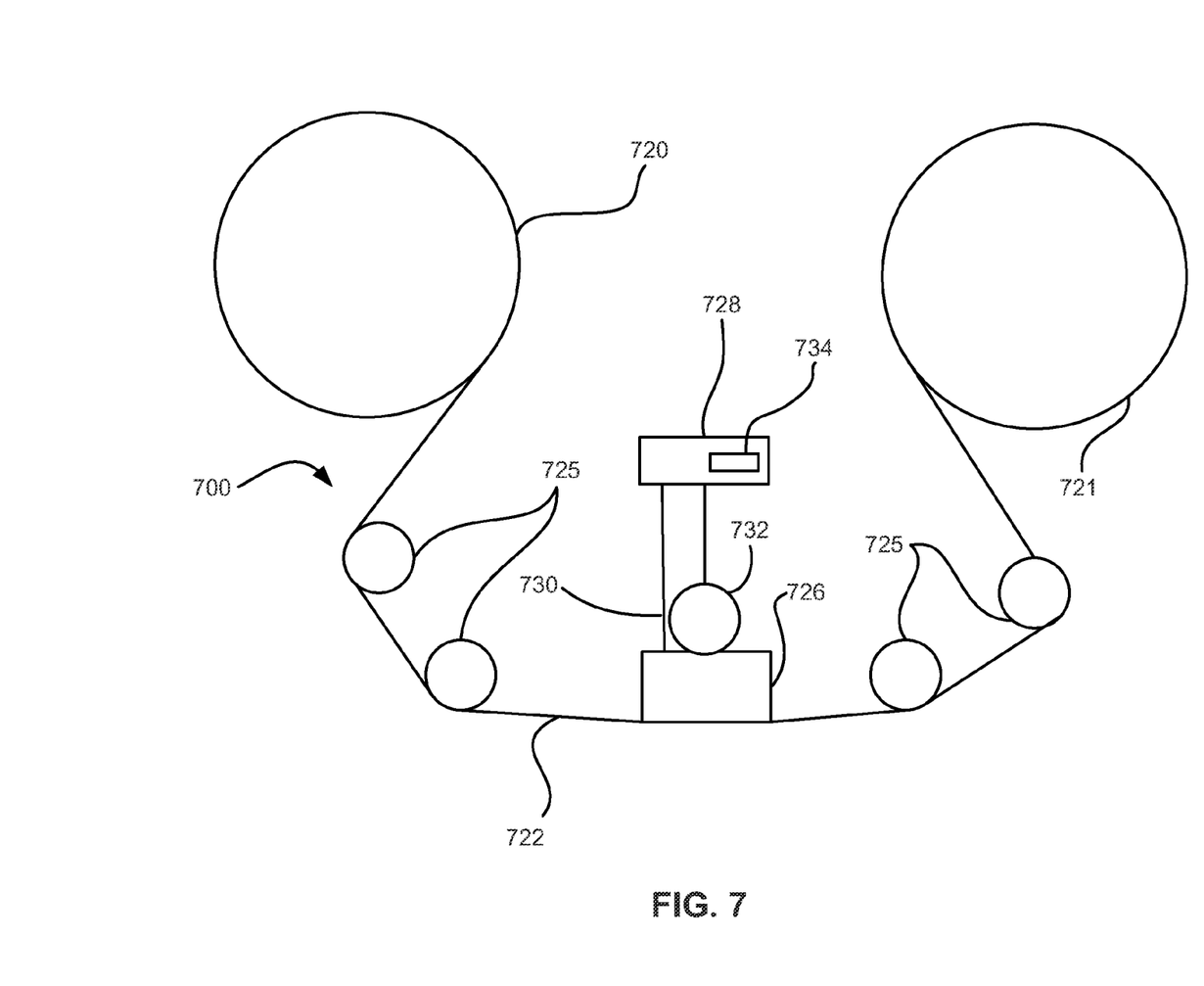
FIG. 7 is a schematic diagram of a simplified tape drive system, according to one embodiment.

Referring now to FIG. 7, a simplified tape drive 700 of a tape-based data storage system is shown according to one embodiment, which may be employed in the context of the present invention. While one specific implementation of a tape drive is shown in FIG. 7, it should be noted that the embodiments described herein may be implemented in the context of any type of tape drive system or data storage system, as would be understood by one of skill in the art upon reading the present descriptions.

As shown, a tape supply cartridge 720 and a take-up reel 721 are provided to support a tape 722. One or more of the reels may form part of a removable cassette and are not necessarily pail of the system 700. The tape drive, such as that illustrated in FIG. 7, may further include drive motor(s) to drive the tape supply cartridge 720 and the take-up reel 721 to move the tape 722 over a tape head 726 of any type.

Guides 725 guide the tape 722 across the tape head 726. Such tape head 726 is in turn coupled to a controller assembly 728 via a cable 730. The controller 728 typically controls head functions such as servo following, writing, reading, etc. The cable 730 my include read/write circuits to transmit data to the head 726 to be recorded on the tape 722 and to receive data read by the head 726 from the tape 722. An actuator 732 controls position of the head 726 relative to the tape 722.

An interface 734 may also be provided for communication between the tape drive and a host (integral or external) to send and receive the data and for controlling the operation of the tape drive and communicating the status of the tape drive to the host, all as will be understood by those of skill in the art.

For example, in one embodiment, a magnetic data storage system (such as tape system 700) may comprise at least one magnetic head 726 (as described herein according to any embodiment for reading from and/or writing to a magnetic recording medium, such as tape 722), a magnetic recording medium 722 as described herein according to any embodiment, a drive mechanism (such as drive motor(s) of any type to drive the tape supply cartridge 720 and the take-up reel 721 to move the magnetic recording medium 722 over the at least one magnetic head 726) for passing the magnetic recording medium 722 over the at least one magnetic head 726, and a controller 728 electrically coupled to the at least one magnetic head 726 for controlling operation of the at least one magnetic head 726.

While various embodiments have been described above with reference to certain figures, it is to be understood by those skilled in the art that various changes may be made and equivalents may be substituted without departing from the scope of the present invention. In addition, many modifications may be made to adapt a particular situation to the teachings of the present invention without departing from the scope of the present invention. Thus, the breadth and scope of a preferred embodiment should not be limited by any of the above-described exemplary embodiments, but should be defined only in accordance with the following claims and their equivalents. For example, the present invention may be used for various applications not specifically described herein. While embodiments described above are directed toward applications in linear recording magnetic tapes, one of skill in the art ay appreciate potential applications in magnetic disk recording media, among other applications.

What is claimed is:

1. A method for using a linear magnetic recording medium with a servo band having a width b that is less than or equal to about 1.2 B/N, where N is an integer greater than or equal to 2, and B corresponds to a distance between data read/write transducers of a magnetic head usable with the medium in a direction transverse to a longitudinal length of the medium, the method comprising:
    positioning a magnetic head in a first lateral medium region of a medium of width b with a first servo reader of at least one group of N servo readers of the magnetic head for reading the servo band; and
    positioning the magnetic head in a second lateral region of width b with a second servo reader of the at least one group of N servo readers for reading the servo band.

2. The method as recited in claim 1, wherein the servo readers are positioned apart from one another by a distance substantially equal to the servo band width b in a main direction of the magnetic head, which in operation is transverse to the longitudinal medium length.

3. The method as recited in claim 1, wherein a servo pattern of the servo band substantially fills the width b of the servo band.

4. The method as recited in claim 1, wherein the magnetic medium is a linear magnetic recording tape.

5. The method as recited in claim 1, wherein the servo band width b further comprises a first margin to account for a width of the servo reader.

6. The method as recited in claim 5, wherein the servo band width b further comprises a second margin to account for track following servo operation.

7. The method as recited in claim 1, wherein the servo band width b is substantially equal to B/N.

8. The method as recited in claim 1, wherein N equals 4 or 8.

9. A method for formatting a linear magnetic recording medium, the method comprising:
    writing at least one servo band to a magnetic medium, the at least one servo band having a servo pattern readable by a servo reader of a compatible magnetic head for positioning thereof,
    wherein the servo pattern substantially fills a width b of the servo band,
    wherein the servo band width b is less than or equal to about 1.2 B/N,
    wherein N is an integer greater than or equal to 2, and
    wherein B corresponds to a distance between data transducers of the compatible magnetic head in a direction transverse to a longitudinal length of the medium.

10. The method as recited in claim 9, wherein the servo band width b further comprises a first margin to account for a width of the servo reader.

11. The method as recited in claim 10, wherein the servo band width b further comprises a second margin to account for track following servo operation.

12. The method as recited in claim 9, wherein the servo band width b is substantially equal to B/N.

13. The method as recited in claim 9, wherein N equals 4 or 8.

14. A method implemented in a system having a magnetic head with one or more groups of at least two servo readers, the magnetic head also having one or more groups of data read/write transducers spaced apart the distance B in the main direction of the head, the method comprising:
    positioning a first servo reader of a group of servo readers of a magnetic head in a first lateral medium region of a servo band having width b that is less than or equal to about 1.2 B/N, where N is an integer greater than or equal to 2, and B corresponds to a distance between data read/write transducers of the magnetic head in a direction transverse to a direction of travel of the medium relative to the head;
    conducting a first read and/or write operation on a portion of a data band;
    adjusting a position of the magnetic head during the first read and/or write operation based on signals from the first servo reader reading the servo band; and
    positioning a second servo reader of the group of servo readers of the magnetic head in a second lateral medium region of the servo band;
    conducting a second read and/or write operation on another portion of the data band; and
    adjusting a position of the magnetic head during the second read and/or write operation based on signals from the second servo reader reading the servo band.

15. The method as recited in claim 14, wherein each servo reader is positioned apart from one another by a distance substantially equal to a servo band width b in a main direction of the magnetic head, which in operation is transverse to a direction of media travel thereacross.

16. The method as recited in claim 14, wherein the medium is a linear magnetic recording tape.

17. The method as recited in claim 14, wherein the servo band width b further comprises a first margin to account for a width of the servo reader.

18. The method as recited in claim 17, wherein the servo band width b further comprises a second margin to account for track following servo operation.

19. The method as recited in claim 14, wherein the servo band width b is substantially equal to B/N, wherein the group has N servo readers.

20. The method as recited in claim 14, wherein the group has N servo readers, wherein N equals 4 or 8.

* * * * *